(12) United States Patent
Takashima (10) Patent No.: US 7,570,263 B2
(45) Date of Patent: Aug. 4, 2009

(54) MAP DISPLAY DEVICE AND NAVIGATION SYSTEM THEREWITH

(75) Inventor: Kenji Takashima, Obu (JP)

(73) Assignee: DENSO CORPORATION, Kariya (JP)

( * ) Notice: Subject to any disclaimer, the term of this patent is extended or adjusted under 35 U.S.C. 154(b) by 91 days.

(21) Appl. No.: 11/402,892

(22) Filed: Apr. 13, 2006

(65) Prior Publication Data
US 2006/0241861 A1 Oct. 26, 2006

(30) Foreign Application Priority Data

Apr. 21, 2005 (JP) ............................. 2005-124062
Mar. 13, 2006 (JP) ............................. 2006-068056

(51) Int. Cl.
*G06T 11/00* (2006.01)
*G06F 17/21* (2006.01)

(52) U.S. Cl. ..................... 345/467; 345/471; 701/23; 715/264; 715/265; 715/269

(58) Field of Classification Search ............... 701/23
See application file for complete search history.

(56) References Cited

U.S. PATENT DOCUMENTS

| 6,304,212 B1 | 10/2001 | Aoki et al. | |
| 2003/0149557 A1* | 8/2003 | Cox et al. | 704/2 |
| 2003/0163254 A1* | 8/2003 | Chen et al. | 701/213 |
| 2004/0136408 A1* | 7/2004 | Tomobe et al. | 370/532 |
| 2004/0138806 A1* | 7/2004 | Ichida | 701/200 |

FOREIGN PATENT DOCUMENTS

| EP | 1 273 887 A2 | | 1/2003 |
| JP | A-4-102014 | | 4/1992 |
| JP | 05158403 A | * | 6/1993 |
| JP | A-5-158403 | | 6/1993 |
| JP | A-8-124092 | | 5/1996 |
| JP | 09016075 A | * | 1/1997 |
| JP | A-9-16075 | | 1/1997 |
| JP | A-9-297191 | | 11/1997 |
| JP | A-11-98445 | | 4/1999 |
| JP | A-H11-219105 | | 8/1999 |
| JP | A-2002-310721 | | 10/2002 |
| JP | A-2003-4457 | | 1/2003 |

OTHER PUBLICATIONS

Office Action dated Oct. 7, 2008 from Japanese Patent Office in corresponding JP Patent Application No. 2006-068056 (and English Translation).
Office Action dated Dec. 26, 2008 in corresponding Chinese Patent Application No. 2006 1007 4626.2 (and English translation).

* cited by examiner

*Primary Examiner*—Kee M Tung
*Assistant Examiner*—Michelle K Lay
(74) *Attorney, Agent, or Firm*—Posz Law Group, PLC

(57) ABSTRACT

When an area corresponding to area information is determined to use a default font, an ECU displays characters by using the default font stored in a ROM. When an area corresponding to area information is determined to not use a default font, the ECU reads out an exclusive font corresponding to the area to store it in a RAM, and displays characters by using the exclusive font stored in the RAM.

23 Claims, 5 Drawing Sheets

| AREA INFO | FONT | FONT CHANGE |
|---|---|---|
| US | DEFAULT | NO |
| EU | DEFAULT | NO |
| AU | DEFAULT | NO |
| JP | JAPANESE | YES |
| CN | SIMPLIFIED CHINESE | YES |
| TW | TRADITIONAL CHINESE | YES |
| KR | HANGUL | YES |

MAP DISPLAY DEVICE AND NAVIGATION SYSTEM THEREWITH

CROSS REFERENCE TO RELATED APPLICATIONS

This application is based on and incorporates herein by reference Japanese Patent Applications No. 2005-124062 filed on Apr. 21, 2005, and No. 2006-68056 filed on Mar. 13, 2006.

FIELD OF THE INVENTION

The present invention relates to a map display device that displays a character by selecting a font used in an area, and further relates to a navigation system using this map display device.

BACKGROUND OF THE INVENTION

A conventional navigation system displays a character, by using a font selected by a user. A navigation system described in Patent Document 1 has three display modes (Japanese kanji mode, Japanese romaji mode, and Japanese katakana mode); characters are displayed based on the mode a user selects.

The conventional navigation system is assumed to be used only in one country (e.g., Japan), not in other countries (e.g., China, Taiwan); this system cannot display characters used in other countries. Thus, a navigation system for a certain language region is manufactured to contain a specific font used in the certain language region. This may cause a problem on design or costs.

Patent Document 1: JP-H9-16075 A

SUMMARY OF THE INVENTION

It is an object of the present invention to provide a map display device capable of adequately displaying a character used in an area (language region) where the device is to be used, and, furthermore, to provide a vehicular navigation system using this map display device.

To achieve the above object, a map display device is provided as follows. A display is included; a map data storage unit is included to store map data covering an area; a font storage unit is included to store a plurality of fonts; and a display control unit is included to select, from the plurality of fonts, a font corresponding to the area covered by the map data, and to cause the display to display (i) a map based on the map data and (ii) a character by using the selected font.

Thus, in the map display device, the display control unit selects, from the font storage unit, a font corresponding to an area covered by the map data stored in the map data storage unit; then, the display control unit causes the display to display (i) a map based on the map data and (ii) a character based on the selected font. Under this structure, even when this device is used in one of areas that may use individually different fonts, characters are able to be displayed by using a font corresponding to one of the areas covered by the map data, i.e., by using a font used in the area covered by the map data. Therefore, it is unnecessary to manufacture, for a specific area, a specific device, which contains an exclusive font used in the specific area. In other words, a device having the same structure (or specification) as the above can be used in several areas (several language regions), thereby simplifying design or saving costs. Furthermore, a user need not select a font, thereby enhancing user-friendliness of the device.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A map display device as an example embodiment of the present invention is included in a navigation system provided in a vehicle. The system includes various devices shown in FIG. 1.

Figure 1:
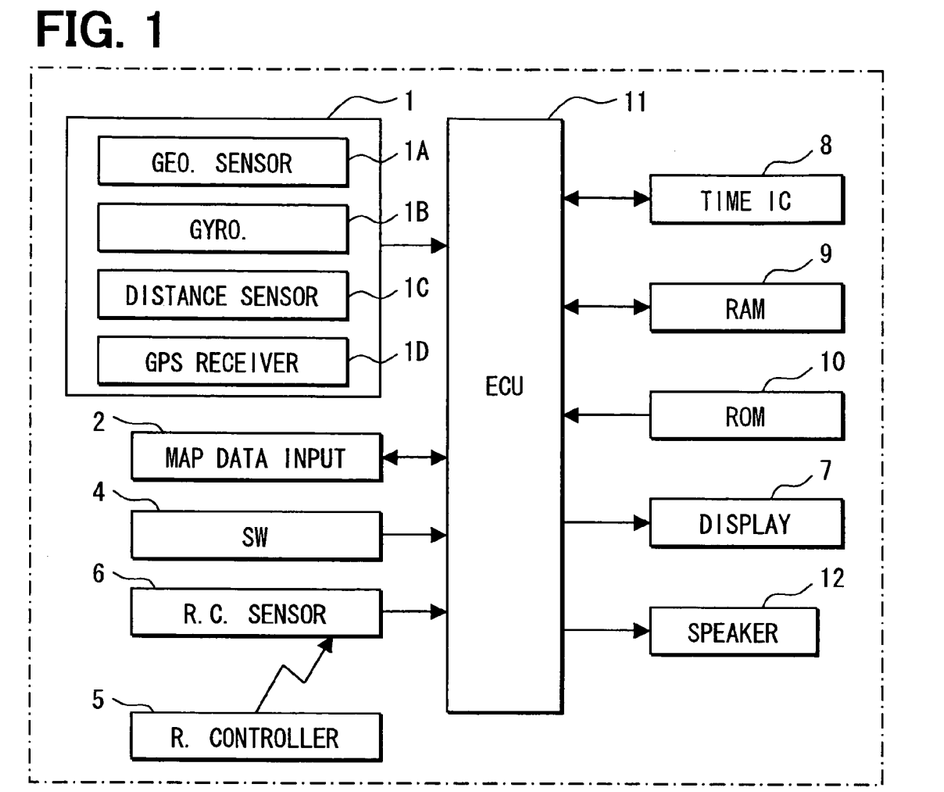
FIG. 1 is a block diagram illustrating an overall structure of a map display device of an example embodiment of the present invention.

A position detector 1 includes a geomagnetic sensor 1A, a gyroscope 1B, a distance sensor 1C, and a GPS (Global Positioning System) receiver 1D, so as to detect a current position and advancing direction of the vehicle.

The geomagnetic sensor 1A includes a ring of ferromagnet such as permlloy, excitation winding coil for exciting the ring, and two mutually-perpendicular detection winding coils for detecting directions. An alternating electric current is applied to the excitation coil; a voltage generated in the two detection coils is measured; and an advancing direction is detected as an absolute direction.

The gyroscope 1B includes, e.g., a crystal oscillator to detect a yaw rate of the vehicle from a vibration based on the Coriolis force generated when the oscillator vibrates.

The distance sensor 1C generates rotation signals of a traveling wheel or axle (none shown); the rotation signals are used to detect a travel distance of the vehicle.

The GPS receiver 1D receives GPS signals from GPS satellites (none shown) to detect coordinates (longitude and latitude) and altitude of a position where the vehicle is currently traveling.

The position detector 1 supplements detection results from the above four devices, with each other to detect a current position with high accuracy. Depending on a required accuracy, all the four devices are not necessarily used. Furthermore, a current position and advancing direction can be also computed based on a detection signal from others such as a steering wheel sensor.

A map data input device 2 includes a map data storage medium such as a hard disk to store map data for a given area (map-stored area); the map data includes road information, address information, and map image information. The map data further includes (i) area information (e.g., coordinates, country code) to indicate the map-stored area, and (ii) time difference data to indicate a time difference between time in the map-stored area and world standard time. The storage medium can be alternatively a CD-ROM, DVD-ROM, or memory card.

Figure 2:
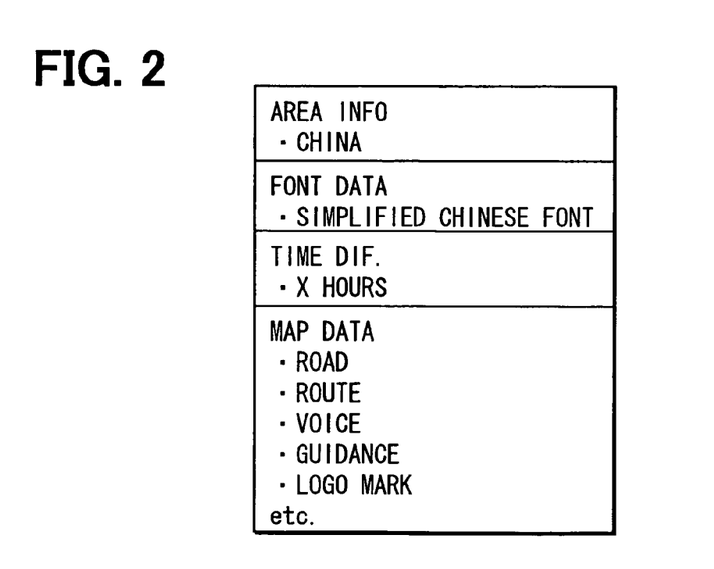
FIG. 2 is a diagram illustrating data items in a map data storage medium.

Examples of data items in the map data storage medium are shown in FIG. 2 with respect to China as a map-stored area. Map-stored area information naturally relates to China. Character display in a Chinese map needs a font, or simplified Chinese font exclusive to China (main land), instead of fonts used in a map in the US or a European country; so that the map data storage medium stores the simplified Chinese font, and, furthermore, time difference data or map data related to China.

An operation switch 4 includes several mechanical switches to be used to input instructions for starting or ending operation to the navigation system. The operation switch 4 can be a touch panel to detect that an operation key shown on a display panel is pushed. A remote controller 5 together with a remote control sensor 6 functions as a multi-purpose switch capable of substituting the operation switch 4.

A display 7 is an in-vehicle compact display to display an image for navigation such as a map image and characters, and, furthermore, to display time in the area on the displayed map. The display 7 can be alternatively a vehicular head-up display.

A time IC 8 counts time and causes the display 7 to display time in an area where the navigation system is used. The time indicated by the time IC 8 can be variable.

Figure 3:
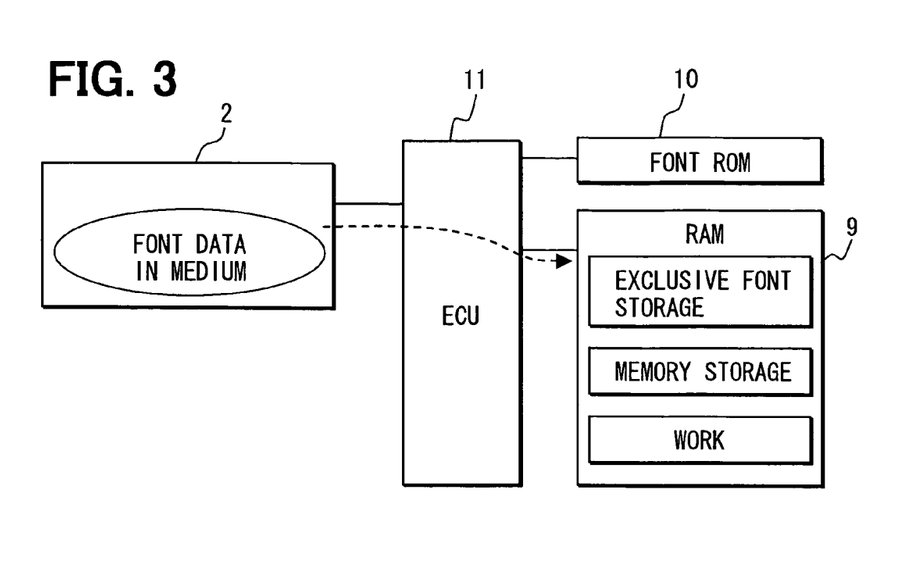
FIG. 3 is a diagram illustrating a storage structure of a RAM.

A RAM (Random Access Memory) 9 has three storage areas of (i) an exclusive font storage area, (ii) a memory storage area, and (iii) a work area. The exclusive font storage area stores an exclusive font (or exclusive font data) read out from the map data storage medium by the map data input device 2. The memory storage area stores information such as a memory point designated by a user. The work area stores a temporary computation result such as a computed route. The exclusive font can be alternatively stored in external memory such as a memory card other than the RAM 9.

A ROM (Read Only Memory) 10 stores, e.g., a font (or font data) used in the US or a European country, as a default font.

Figure 4:
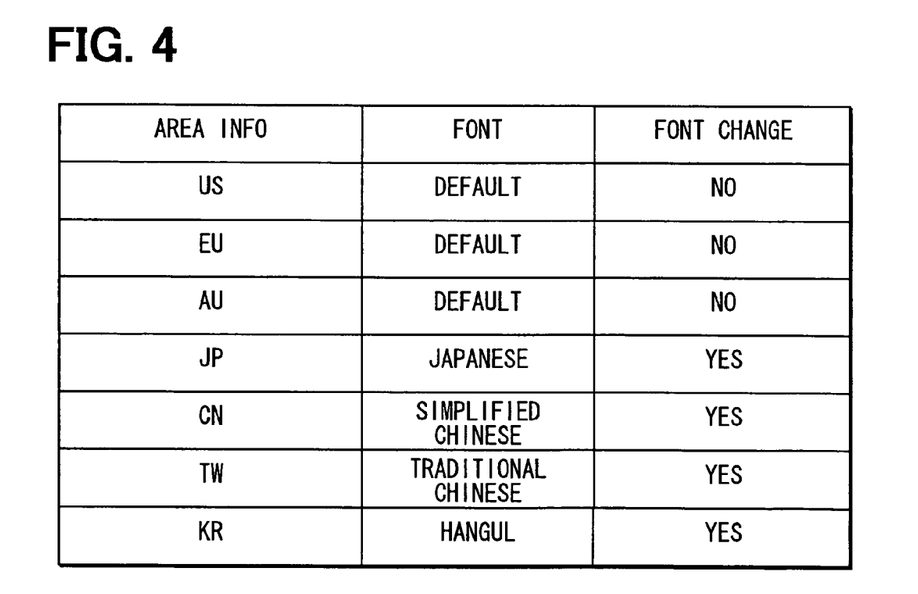
FIG. 4 is a table illustrating examples of fonts in individual areas.

Examples of fonts used in several areas are shown in FIG. 4. A font used in each of the US (US), a European country (EU), and Australia (AU) is designated as a default font and previously stored in the ROM 10. Different fonts are used in other areas, instead of the default font, as follows: a Japanese font is used in an area of Japan (JP); a simplified Chinese character is used in an area of China (CN); a traditional Chinese font is used in an area of Taiwan (TW); and a hangul font is used in an area of Korea (KR). These fonts other than the default font are stored in the map data storage medium.

This eliminates necessity to previously store all fonts, which are to be possibly used, in the ROM 10 or the like. In other words, it can be determined whether a font used in a certain area corresponds to the default font. A font not corresponding to the default font can be loaded on the RAM 9 from the map data storage medium storing an exclusive font used in the certain area in addition to map data of the certain area. Thus, a necessary font can be securely prepared each time a map of any area is displayed.

Even when an exclusive font other than the default font is used for displaying characters, the default font is still used for displaying characters, e.g., in an initial screen that appears when the navigation system turns on.

An ECU (Electronic Control Unit) 11 is used for navigation to perform various navigation operations such as map display or character display based on instruction from the operation switch 4 or the remote controller 5. For instance, the ECU 11 reads out map data from the map data input device 2 based on a current position and advancing direction detected by the position detector 1. The ECU 11 then causes the display 7 to display a map image overlapped with a mark indicating the current position; furthermore, it causes a speaker 12 to output various voice guidance. The ECU 11 also displays a travel route to a destination that has been designated while overlapping it on the displayed map.

The ECU 11 displays a position name by using a font corresponding to an area shown in a map on the display 7. For instance, when the system turns on, the ECU 11 first reads out area information from the map data storage medium. When an area corresponding to the area information uses the default font, the ECU 11 reads out the default font stored in the ROM 10 and causes the display 7 to display characters such as a position name by using the read default font. In contrast, when an area corresponding to the area information does not use the default font, the ECU 11 reads out an exclusive font from the map data storage medium and stores it in the RAM 9. The ECU 11 causes the display 7 to display characters by using the exclusive font stored in the RAM 9. Here, a character to be displayed on the map image can be designated with a character code, which corresponds to the character.

The ECU 11 further computes time in the area of the map on the display 7 and displays the computed time on the display 7. For instance, when the system turns on, the ECU 11 reads out time difference data from a map data storage medium. When the GPS receiver 1D can receive GPS signals, the ECU 11 computes time in the area by setting forward or back the world standard time included in the received signals, by a time value indicated by the time difference data so as to constantly adjust time indicated by the time IC 8. At the same time, the ECU 11 sets a time flag (not shown) to "1" and causes the display 7 to display information that the displayed time by the time IC 8 is correct. When the GPS receiver 1D cannot receive GPS signals, e.g., in a tunnel, the ECU 11 resets the time flag to "0" and causes the display 7 to display information that the displayed time by the time IC 8 may be not correct.

Furthermore, the ECU 11 reports anomaly (or anomaly occurrence) via the speaker 12 when the current position is not included in an area of map data stored in the map data input device 2 or the map data storage medium.

The above default font and exclusive font used in various areas can be designated based on the known UNICODE, which classifies characters in main languages in the world, as character codes. Character display can be therefore appropriately performed in an area where this system is used.

Next, a process for determining a font to be used will be explained with reference to a flowchart in FIG. 5. This process is executed each time the navigation system turns on.

At Step 201, the ECU 11 determines whether a map data storage medium is inserted to the map data input device 2. With no medium inserted, Step 202 is performed to cause the display 7 to display information that a map data storage medium should be inserted to the map data input device 2; then, Step 201 is repeated. With the medium inserted, Step 203 is performed.

At Step 203, the ECU 11 reads out map data including map image information to be displayed as a map image on the display 7. At Step 204, the ECU 11 reads (i) area information indicating a certain area covered by the map data read at Step 203, and (ii) time difference data.

At Step 205, it is determined whether the certain area uses the default font based on the read area information. Referring to the area information makes it accurate to determine whether the certain area uses the default font. With the determination affirmed, Step 206 is performed to determine that character display uses the default font stored in the ROM 10; then, Step 211 is performed. With the determination negated, Step 207 is performed.

At Step 207, the ECU 11 starts reading an exclusive font corresponding to map data read at Step 203, from the medium inserted in the input device 2. At Step 208, it is determined whether reading the exclusive font is completed. With the determination affirmed, Step 209 is performed. With the determination negated, the determination is repeated till the reading is completed. Thus the exclusive font corresponding to an area not using the default font can be read out from the map data storage medium, so that a character display using the exclusive font can be appropriately performed.

At Step 209, the read exclusive font is then stored in the RAM 9. At Step 210, it is determined that character display is performed with the exclusive font stored in the RAM 9. At Step 211, a corresponding navigation operation starts by using the font that is determined to be used at Step 206 or 210.

Figure 6:
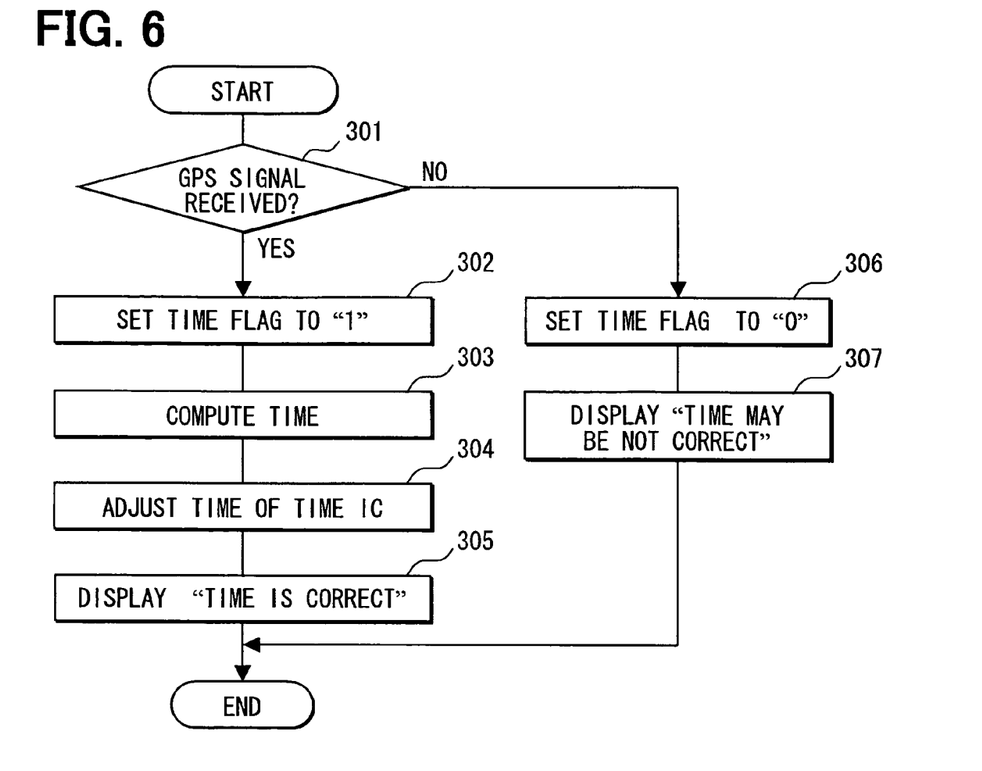
FIG. 6 is a flowchart illustrating a process for reporting time in an area covered by map data.

Next, a process for computing and reporting time in an area covered by map data will be explained with reference to a flowchart in FIG. 6. This process starts at given intervals while the system operates.

At Step 301, the ECU 11 determines whether the GPS receiver 1D has received a GPS signal. With the determination affirmed, Step 302 is performed. With determination negated, Step 306 is performed.

Figure 5:
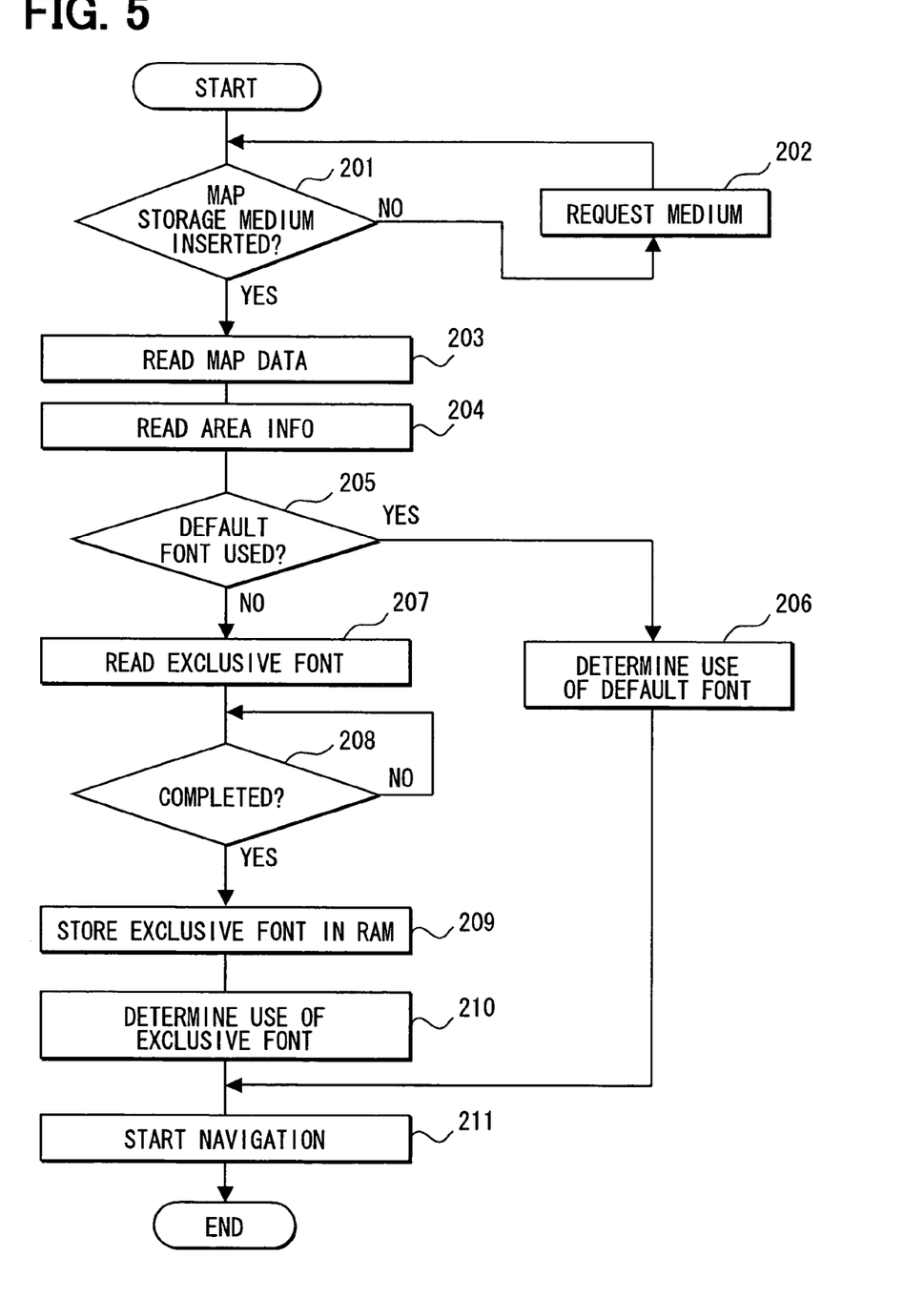
FIG. 5 is a flowchart illustrating a process for determining a font to be used.

At Step 302, the time flag is set to "1." At Step 303, the world standard time included in the received GPS signal is set forward or backward by the time difference data read at Step 204 in FIG. 5, and the time in the area indicated by the map data is thus computed. At Step 304, the time indicated by the time IC 8 is adjusted to the time computed at Step 303. At Step 305, the time indicated by the time IC 8 is displayed on the display 7. At the same time, information that the displayed time is correct is displayed on the display 7; then, the process terminates.

In contrast, at Step 306, the time flag is reset to "0." At Step 307, the time indicated by the time IC 8 is displayed on the display 7. At the same time, information that the displayed time may be not correct is displayed on the display 7; then, the process terminates. Thus, time in the area covered by the map data is computed and reported securely.

Figure 7:
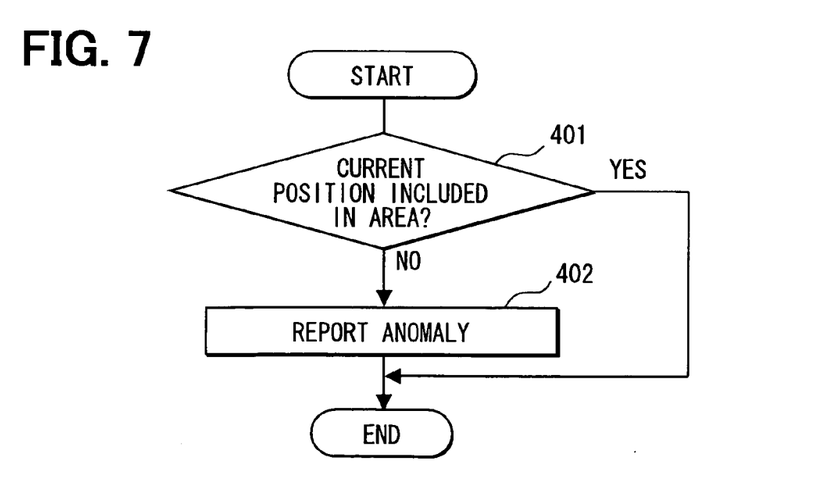
FIG. 7 is a flowchart illustrating a process for reporting anomaly occurrence.

Next, a process for reporting an anomaly occurrence will be explained with reference to a flowchart in FIG. 7. The process takes place at given intervals while the system operates.

At Step 401, the ECU 11 determines whether a current position detected by the position detector 1 is outside of an area indicated by the map data. With the determination affirmed, Step 402 is performed to report an anomaly occurrence via the speaker 12; then, the navigation operation is stopped to end the process. That the current position is not included in the area covered by the map data means an occurrence of an anomaly that a map data storage medium for a different area is inserted in the input device 2. In contrast, when the determination at Step 401 is affirmed, the process immediately terminates.

As explained above, in the map display device of this example embodiment, the ECU 11 performs map display in two different manners depending on a font used in an area corresponding to area information. When the area uses the default font, the ECU 11 reads out a default font stored in the ROM 10 and causes the display 7 to display characters by using the read default font. In contrast, when the area does not use the default font, the ECU 11 reads a corresponding exclusive font from the map data storage medium to store it in the RAM 9 and causes the display 7 to display characters by using the exclusive font stored in the RAM 9. This allows the map display device to display characters by a font corresponding to an area covered by map data displayed on the display 7 no matter where the device is used. Thus it is unnecessary to manufacture, for a certain area, a map display device having a specific font used in the certain area, allowing one map display device to cover all areas. This is preferred in light of designing or costs. Furthermore, this eliminates necessity for a user to select a font to be used, enhancing user-friendliness in the system.

(Modification)

For instance, in the above map display device, a position name on the map image is displayed with the font corresponding to an area covered by map data. However, this font can be also used for characters in a setting display window, e.g., a destination setting display window shown in FIGS. 8A to 8C (a Japanese font in FIG. 8A, a simplified Chinese font in FIG. 8B, a default font in FIG. 8C). Furthermore, other commands for operations can be also displayed by using the above-selected font. This enhances user-friendliness of this device.

The above map display device is included in the navigation system. However, not limited to this, the map display device can be included in a mobile device having a function of displaying a map based on a map data storage medium.

In the above example embodiment, when the exclusive font is included in a map data storage medium, the exclusive font is once loaded in the exclusive font storage area in the RAM 9 and is then read out from the RAM 9. However, the exclusive font can be directly read from the map data storage medium, which eliminates the exclusive font storage area in the RAM 9. The structure of the RAM 9 can be simplified.

Figure 8A:
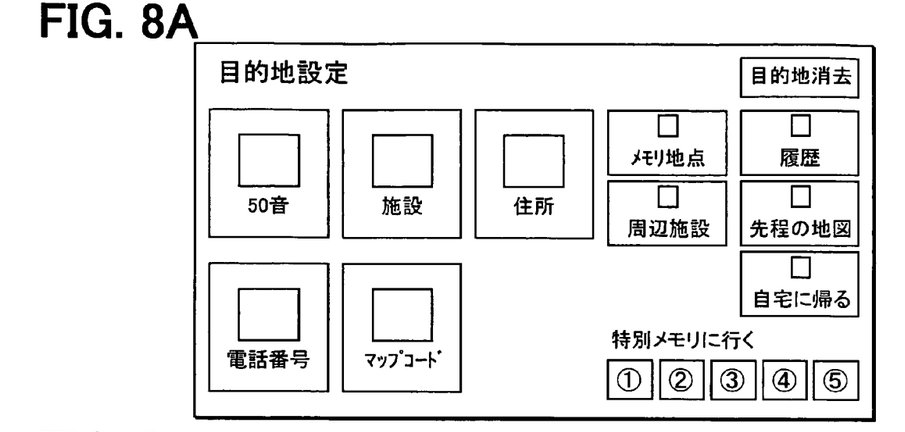
FIGS. 8A, 8B, 8C are operational screen examples for designating destinations with a Japanese font, a Chinese simplified font, and a default font, respectively.
Figure 8B:
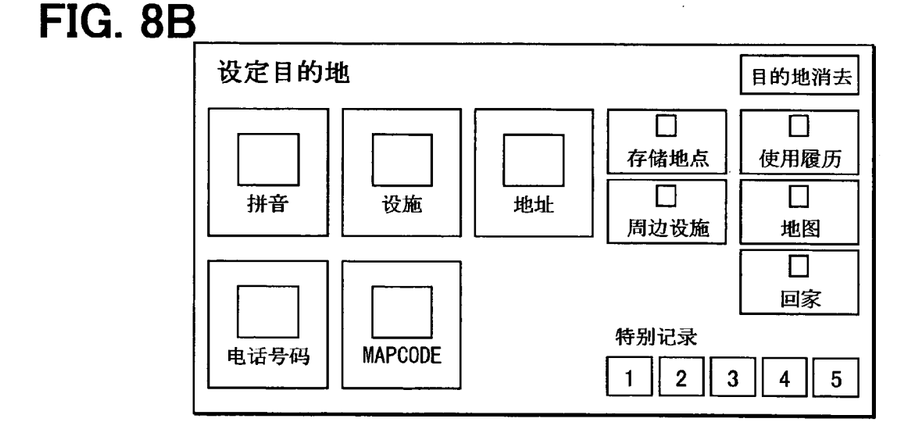
Figure 8C:
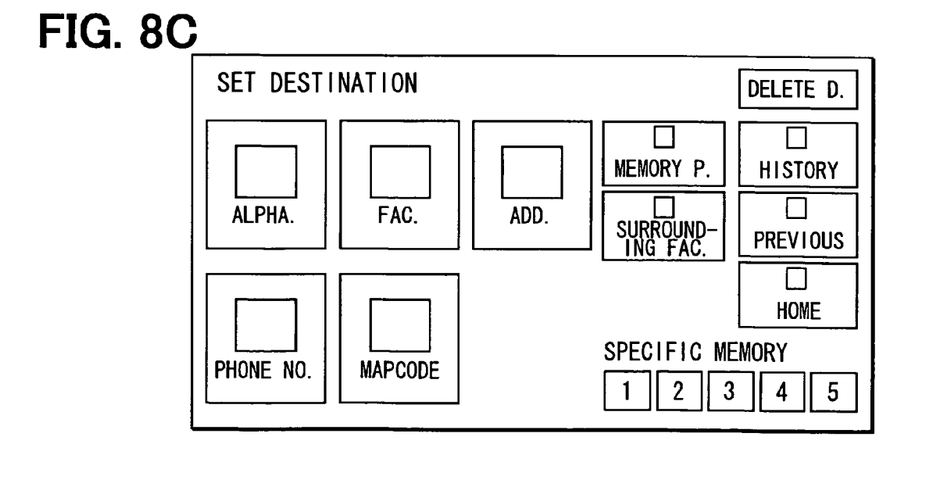

Furthermore, when an area of map data stored in a map data storage medium uses an exclusive font, the exclusive font can be used for all the characters included in the map. However, as shown in FIGS. 8A, 8B, a character that is can be displayed without using the exclusive font, e.g., an alphabet or numeral, can be displayed with the default font. Each character to be displayed on the display 7 can be designated with a character code. Therefore, which of an exclusive font and a default font is to be used can be determined with respect to each character. Furthermore, a user can select which font of the exclusive font and default font is to be used.

Each or any combination of processes or steps explained in the above can be achieved as a software unit (e.g., subroutine) or a hardware unit (e.g., circuit or integrated circuit), including or not including a function of a related device; furthermore, the hardware unit can be constructed inside of a microcomputer.

It will be obvious to those skilled in the art that various changes may be made in the above-described embodiments of the present invention. However, the scope of the present invention should be determined by the following claims.

What is claimed is:

1. A map display device comprising:
    a display;
    a map data storage unit storing (i) map data covering an area and (ii) area information for indicating the area covered by the map data;
    a font storage unit storing a plurality of fonts, each font of the plurality of fonts corresponding to a language used in an area indicated by area information, the each font being associated with the area information; and
    a display control unit configured to
        read the area information from the map data storage unit,
        determine, from the plurality of fonts, a font associated with the read area information, and cause the display to display (i) a map based on the map data included in the map data storage unit and (ii) a character by using the determined font, the display control unit being further configured to determine, without using a detection result of a global positioning system, a font corresponding to a language used in an area indicated by the area information by reading the area information from the map data storage unit prior to displaying a position name as the character on a map in the display each time the map display device turns on, and thereafter cause the display to display the position name as the character by using the determined font corresponding to the language associated with the read area information instead of a global positioning system location, thereby allowing a navigation operation to start.

2. The map display device of claim 1, wherein the display control unit is designed to initially select a default font which corresponds to a language that is previously defined to cause the display to display a character by using the default font, and when the area covered by the map data uses an exclusive font which corresponds to a language use in the covered area and is different from the default font, the display control unit selectively reads out the exclusive font from the plurality of fonts in the font storage unit.

3. The map display device of claim 2, wherein the map data storage unit further stores the exclusive font when the area covered by the map data uses the exclusive font, the font storage unit includes a default font storage sub-unit for storing the default font and an exclusive font storage sub-unit for storing the exclusive font that is read out from the map data storage unit, and the display control unit selects a font corresponding to the area covered by the map data from one of the default font storage sub-unit and the exclusive font storage sub-unit.

4. The map display device of claim 3, wherein when the area covered by the map data uses the exclusive font, the display control unit selects the exclusive font for displaying all characters.

5. The map display device of claim 3, wherein when the area covered by the map data uses the exclusive font, the display control unit selects the exclusive font for displaying a character, which is able to be displayed only by using the exclusive font, and the default font for displaying a character, which is able to be displayed not only by using the exclusive font but also by using the default font.

6. The map display device of claim 3, wherein the map data storage unit is one of a plurality of map data storage units, each map data storage unit storing (i) map data covering one of a plurality of areas and (ii) area information indicating the covered one of the plurality of areas, and (iii) one of a plurality of exclusive fonts if the one of the exclusive fonts is present for the covered one of the plurality of areas, the one of the exclusive fonts being different from the default font and corresponding to a language used in the covered one of the plurality of areas.

7. The map display device of claim 2, wherein:

the map data storage unit further functions as a part of the font storage unit to store the exclusive font when the area covered by the map data uses the exclusive font;

the font storage unit includes a default font storage sub-unit for storing the default font; and the display control unit selects a font corresponding to the area covered by the map data from one of the default font storage sub-unit and the map data storage unit.

8. The map display device of claim 7, wherein when the area covered by the map data uses the exclusive font, the display control unit selects the exclusive font for displaying all characters.

9. The map display device of claim 7, wherein when the area covered by the map data uses the exclusive font, the display control unit selects the exclusive font for displaying a character, which is able to be displayed only by using the exclusive font, and the default font for displaying a character, which is able to be displayed not only by using the exclusive font but also by using the default font.

10. The map display device of claim 1, further comprising:

a map data input unit configured to receive one map data storage unit of a plurality of map data storage units, the one map data storage unit storing (i) map data covering at least one area among the plurality of areas and (ii) area information for indicating the at least one area covered by the map data, wherein:

the font storage unit is further configured to store the plurality of fonts, each font of the plurality of fonts corresponding to one language among a plurality of languages, the one language being used in the at least one area among a plurality of areas, each area being indicated by area information, the each font being thus associated with the area information; and the display control unit is further configured to read the area information from the one map data storage unit, determine, from the plurality of fonts, a font associated with the area information read from the one map data storage unit received by the map data input unit, and cause the display to display (i) a map based on the map data included in the one map data storage unit and (ii) a character by using the determined font, wherein when the map display device is turned on, the display control unit reads the area information and causes the display to display the character thereafter by using the determined font corresponding to the one language used in the at least one area among the plurality of areas.

11. The map display device of claim 1, wherein:

the display control unit is further configured to initially determine whether the map data is present in the map data storage unit; and the display control unit determines a font based on area information included in the map data when the map data is present.

12. The map display device of claim 1, wherein the map data storage unit further stores character codes being able to designate at least one of the default font in the default font storage unit and the exclusive font in the map data storage unit.

13. The map display device of claim 1, further comprising:

a map data input unit configured to receive the map data storage unit, wherein the display control unit is further configured to determine whether the map data storage unit is received by the map data input unit when the map display device is turned on, and then read the area information from the map data storage unit via the map data input unit when determining that the map data storage unit is received by the map data input unit.

14. The map display device of claim 13, wherein
the display control unit is further configured to cause the display to display information that the map data storage unit be inserted into the map data input unit if it is determined that the map data storage unit is not received by the map data input unit when the map display device is turned on.

15. A navigation system provided in a vehicle, the system comprising:
the map display device of claim 1;
a position detector that detects a vehicle's current position to be indicated on the map;
a time unit that detects world standard time;
a time difference unit that obtains a time difference from the world-standard time in the area covered by the map data; and
a time report unit that computes and reports time in the area based on the world standard time and the time difference.

16. A navigation system provided in a vehicle, the system comprising:
the map display device of claim 1;
a position detector that detects a vehicle's current position to be indicated on the map; and
an anomaly report unit that reports an anomaly in the map data storage unit when the detected current position is not included in the area covered by the map data.

17. A navigation system comprising:
a map data storage unit storing (i) map data covering an area, (ii) area information indicating the area, and (iii) an exclusive font if the exclusive font is present for the covered area, the exclusive font being different from a predetermined default font and corresponding to a language used in the covered area; and
a map display device including,
(1) a display,
(2) a default font storage unit storing the predetermined default font,
(3) a font-area list storage unit storing a list indicating an association between areas and fonts corresponding to languages used in the areas,
(4) a map data input unit configured to receive the map data storage unit, and
(5) a display control unit configured to
read the area information in the received map data storage unit,
determine one of the default font and the exclusive font based on the stored list and the read area information, and
cause the display to display a map based on the map data in the received map data storage unit and a character by using the determined one of the default font in the default font storage unit and the exclusive font in the received map data storage unit,
the display control unit being further configured to determine, without using a detection result of a global positioning system, a font corresponding to a language used in an area indicated by the area information by reading the area information from the map data storage unit prior to displaying a position name as the character on a map in the display each time the map display device turns on, and thereafter cause the display to display the position name as the character by using the determined one of the default font and the exclusive font corresponding to the read area information instead of a global positioning system location, thereby allowing a navigation operation to start.

18. The navigation system of claim 17, wherein
the map data storage unit is one of a plurality of map data storage units, each map data storage unit storing (i) map data covering one of a plurality of areas, (ii) area information indicating the covered one of the plurality of areas, and (iii) one of a plurality of exclusive fonts if the one of the exclusive fonts is present for the covered one of the plurality of areas, the one of the exclusive fonts being different from the default font and corresponding to a language used in the covered one of the plurality of areas.

19. The navigation system of claim 17, wherein
the map data storage unit further stores character codes being able to designate at least one of the default font in the default font storage unit and the exclusive font in the map data storage unit.

20. The navigation system of claim 17, wherein
the map display device further includes a map data input unit configured to receive the map data storage unit; and
the display control unit included in the map display device is further configured to
determine whether the map data storage unit is received by the map data input unit when the navigation system is turned on, and
then read the area information from the map data storage unit via the map data input unit when determining that the map data storage unit is received by the map data input unit.

21. The navigation system of claim 20, wherein
the display control unit is further configured to cause the display to display information that the map data storage unit be inserted into the map data input unit if it is determined that the map data storage unit is not received by the map data input unit when the navigation system is turned on.

22. A method for selecting a font in a display device storing a predetermined default font, the method comprising:
determining, each time the display device turns on, whether a map data input unit is receiving a map data storage unit storing (i) map data covering an area, (ii) area information indicating the area, and (iii) an exclusive font if the exclusive font is present for the covered area, the exclusive font being different from the default font and corresponding to a language used in the covered area;
determining, without using a detection result of a global positioning system, a font corresponding to a language used in an area indicated by the area information by reading the area information from the received map data storage unit, prior to displaying a position name as a character on a map in the display device, when determining that the map data input unit is receiving the map data storage unit;
determining whether the area indicated by the read area information uses a default font or an exclusive font associated with the read area information by referring to a list indicating an association between areas and fonts corresponding to languages used in the areas;
selecting the predetermined default font stored in the display device when determining that the area uses the default font;

selecting the exclusive font included in the received map data storage unit when determining the area uses the exclusive font; and starting displaying (i) the map based on the map data in the received map data storage unit and (ii) the position name as the character by using the determined one of the default font stored in the display device and the exclusive font corresponding to the read area information instead of a global positioning system location, thereby allowing a navigation operation to start.

23. The method of claim 22, further comprising:

displaying information that the map data storage unit be inserted into the map data input unit if it is determined that the map data storage unit is not received by the map data input unit when the display device is turned on.

\* \* \* \* \*